US012372775B2

(12) United States Patent
Osawa (10) Patent No.: US 12,372,775 B2
(45) Date of Patent: Jul. 29, 2025

(54) IMAGING SYSTEM, ENDOSCOPE SYSTEM, CAMERA UNIT, AND SCOPE OF ENDOSCOPE

(71) Applicant: OLYMPUS MEDICAL SYSTEMS CORP., Hachioji (JP)

(72) Inventor: Masato Osawa, Hachioji (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 58 days.

(21) Appl. No.: 18/519,803

(22) Filed: Nov. 27, 2023

(65) Prior Publication Data

US 2024/0094522 A1 Mar. 21, 2024

Related U.S. Application Data

(63) Continuation of application No. PCT/JP2021/020653, filed on May 31, 2021.

(51) Int. Cl.
*G02B 23/24* (2006.01)
*H04N 23/57* (2023.01)
*H04N 23/60* (2023.01)

(52) U.S. Cl.
CPC ..... *G02B 23/2484* (2013.01); *G02B 23/2446* (2013.01); *H04N 23/57* (2023.01); *H04N 23/665* (2023.01)

(58) Field of Classification Search
CPC ............ G02B 23/2484; G02B 23/2446; H04N 23/57; H04N 23/665; H04N 25/70
See application file for complete search history.

(56) References Cited

U.S. PATENT DOCUMENTS

| 2008/0252742 A1* | 10/2008 | Oike ...................... H04N 25/70 348/222.1 |
| 2013/0265403 A1 | 10/2013 | Okawa et al. |
| 2019/0109599 A1* | 4/2019 | Matsuzawa ......... H03M 1/1295 |
| 2019/0117053 A1* | 4/2019 | Ogihara ............. G02B 23/2469 |
| 2019/0132531 A1 | 5/2019 | Nishida |

FOREIGN PATENT DOCUMENTS

| JP | 2013-215481 A | 10/2013 |
| WO | 2013/042647 A1 | 3/2013 |
| WO | 2017/188018 A1 | 11/2017 |
| WO | 2018/088005 A1 | 5/2018 |
| WO | 2018/220940 A1 | 12/2018 |

OTHER PUBLICATIONS

International Search Report dated Aug. 3, 2021, issued in counterpart International Application No. PCT/JP2021/020653, with English Translation. (4 pages).

* cited by examiner

Primary Examiner — Michael E Teitelbaum
(74) Attorney, Agent, or Firm — WHDA, LLP (57) ABSTRACT

In an imaging system, a camera unit and a control unit are connected via a source voltage line and an image signal line. The camera unit includes: a pixel array configured to generate an accumulation signal and a reset signal; a source voltage measuring circuit configured to output a voltage value (VDDA) indicating a second source voltage in the pixel array; a reference voltage generating circuit configured to generate a reference voltage (VBGR); a plurality of AD conversion devices; and a signal transmitting unit. The control unit includes: a source voltage supply device configured to supply a first source voltage (Vout) to the source voltage line; and a signal receiving device configured to receive the image signal and the result of the second AD conversion.

10 Claims, 9 Drawing Sheets

IMAGING SYSTEM, ENDOSCOPE SYSTEM, CAMERA UNIT, AND SCOPE OF ENDOSCOPE

CROSS-REFERENCE TO RELATED APPLICATIONS

The present application is a continuation application based on PCT Patent Application No. PCT/JP2021/020653, filed on May 31, 2021, the entire content of which is hereby incorporated by reference.

BACKGROUND

Field of the Invention

The present invention relates to an imaging system, an endoscope system, a camera unit, and a scope of an endoscope.

Description of Related Art

An endoscope system includes a camera unit that is provided at a distal end of an endoscope and a control unit. The camera unit and the control unit are connected by a cable. Electric power for driving the camera unit or a control signal for controlling the camera unit is transmitted from the control unit via the cable.

An image sensor included in the camera unit and the control unit are connected by a source voltage supply line included in the cable. The control unit supplies a source voltage (a first source voltage value (Vout)) to the source voltage supply line. A source voltage value Vcis (an imager attained voltage, a second source voltage value (VDDA)) in the image sensor drops by a voltage RI from the source voltage value (the first source voltage value (Vout)) supplied by the control unit due to a current (I) consumed in the source voltage supply line. That is, the following expression is established.

$$Vcis = Vout - RI$$

Here, I is a current consumption value and R is a resistance value of the source voltage supply line.

The current consumption value (I) in the source voltage supply line varies according to a driving state of the image sensor. Accordingly, the first source voltage value (Vout) supplied by the control unit needs to be set to a higher voltage value in consideration of a voltage drop which varies according to the current consumption value (I). However, when the first source voltage value (Vout) is set to a higher voltage value, an increase in power consumption of the image sensor or an increase in an amount of heat generated in the source voltage supply line may be caused and thus in-vivo tissue may be badly affected. Therefore, the second source voltage value (VDDA) needs to be monitored and a minimum source voltage (a recommended operating voltage: 3.3 V) needs to be applied.

An endoscope device described in PCT International Publication No. WO 2018/088005 (hereinafter referred to as Patent Document 1) measures a source voltage (Vcis) in an image sensor using an A/D circuit in the image sensor and transmits the measured source voltage to a control unit. The control unit compares the value of the source voltage (Vcis) with an optimal value (Vtarget) and adjusts a source voltage (Vout) supplied to a camera unit such that Vcis approaches Vtarget.

SUMMARY

However, in the endoscope device according to the related art described in Patent Document 1, a source voltage is measured and output in a "vertical blanking period every frame," and the source voltage in an image signal output period cannot be calculated.

In consideration of the aforementioned circumstances, an objective of the present invention is to provide an imaging system, an endoscope system, a camera unit, and a scope of an endoscope that can measure a source voltage in an image sensor in an image signal output period without interfering with outputting of an image signal.

In order to achieve the aforementioned objective, the present invention employs the following means.

According to an aspect of the present invention, there is provided an imaging system in which a camera unit and a control unit are connected via a source voltage line and an image signal line, wherein the camera unit includes: a pixel array configured to generate an accumulation signal and a reset signal; a source voltage measuring circuit configured to output a voltage value (VDDA) indicating a second source voltage in the pixel array; a reference voltage generating circuit configured to generate a reference voltage (VBGR); a plurality of AD conversion devices provided to correspond to pixel columns of the pixel array and provided to the source voltage measuring circuit and the reference voltage generating circuit and configured to perform first AD conversion of a difference between the accumulation signal and the reset signal of the pixel array and second AD conversion of a difference between a value (VDDA) and the reference voltage (VBGR) together; and a signal transmitting unit configured to output results of the first AD conversion and the second AD conversion, and the control unit includes: a source voltage supply device configured to supply a first source voltage (Vout) to the source voltage line; and a signal receiving device configured to receive the image signal and the result of the second AD conversion.

With the imaging system, the endoscope system, the camera unit, and the scope of an endoscope, it is possible to measure a source voltage in an image sensor in an image signal output period without interfering with outputting of an image signal.

DETAILED DESCRIPTION

First Embodiment

An endoscope system 100 according to an embodiment of the present invention will be described below with reference to FIGS. 1 to 11.

Endoscope System 100

Figure 1:
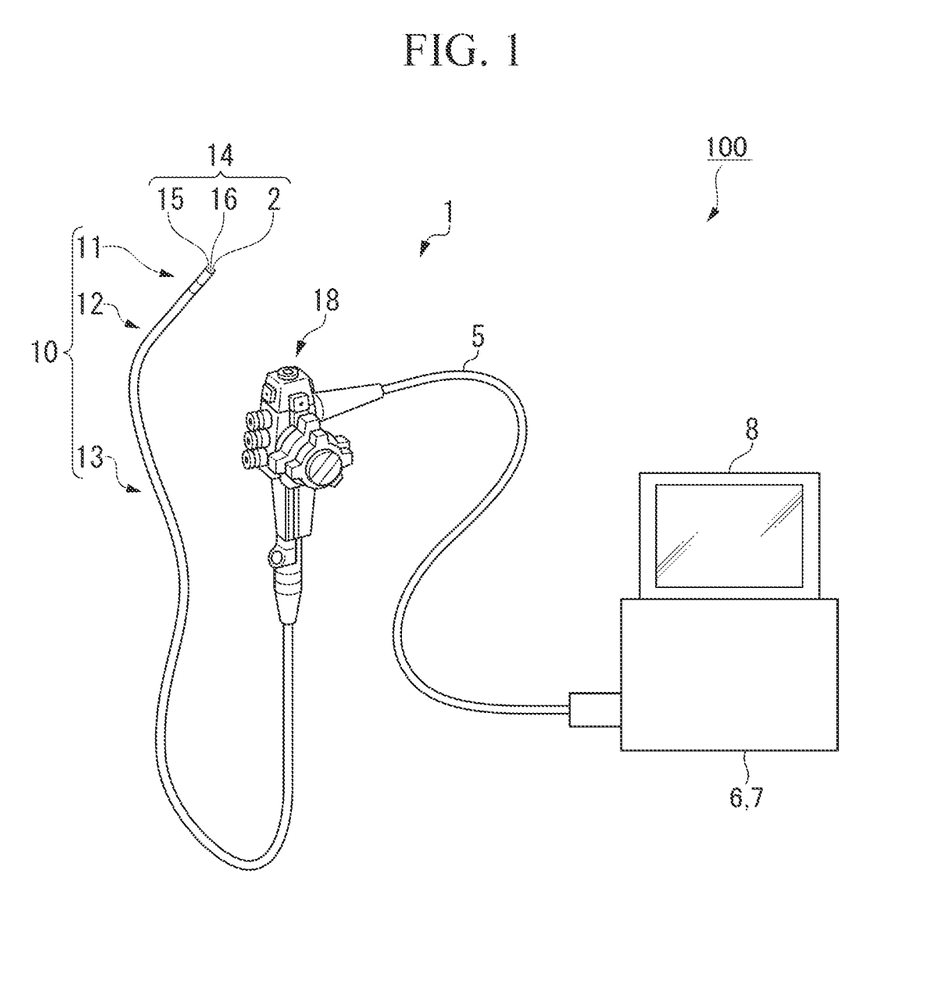
FIG. 1 is a perspective view of an endoscope system according to an embodiment.

FIG. 1 is a perspective view of an endoscope system 100.

The endoscope system (imaging system) 100 includes an endoscope 1, a universal cord 5, a control unit 6, a light source device 7, and a display device 8. The control unit 6 and the light source device 7 are connected to the endoscope 1 via the universal cord 5.

The endoscope 1 is a device that observes or treats a lesion in a body. The endoscope 1 includes an insertion portion 10 and an operation unit 18. The endoscope 1 according to this embodiment is a flexible endoscope, but the endoscope 1 may be another type of endoscope (for example, a hard endoscope or an ultrasonic endoscope).

The insertion portion 10 is a long tubular member that is inserted into a body. The insertion portion 10 includes a hard distal end portion 11, a curved portion 12 that can be curved in a plurality of different directions, and a flexible tubular portion 13 having flexibility. The distal end portion 11, the curved portion 12, and the flexible tubular portion 13 are sequentially connected from the distal end side. The flexible tubular portion 13 is connected to the operation unit 18.

The distal end portion 11 includes a scope (a scope of an endoscope) 14. The scope 14 includes a light source 15, an optical system 16, and an image sensor 2. The curved portion 12 is curved by an operator's operation of the operation unit 18. The flexible tubular portion 13 is a tubular part having flexibility.

The operation unit 18 receives an operation on the endoscope 1. The universal cord 5 is connected to the operation unit 18.

The control unit 6 comprehensively controls the endoscope system 100 as a whole. The control unit 6 performs image processing on an image signal output from the image sensor 2.

The light source device 7 supplies illumination light emitted from the light source 15. The light source device 7 includes, for example, a halogen lamp or an LED. The light source device 7 supplies the generated illumination light to the light source 15 under the control of the control unit 6.

The display device 8 displays an image of a lesion captured by the endoscope 1 or various types of information on the endoscope system 100.

Figure 2:
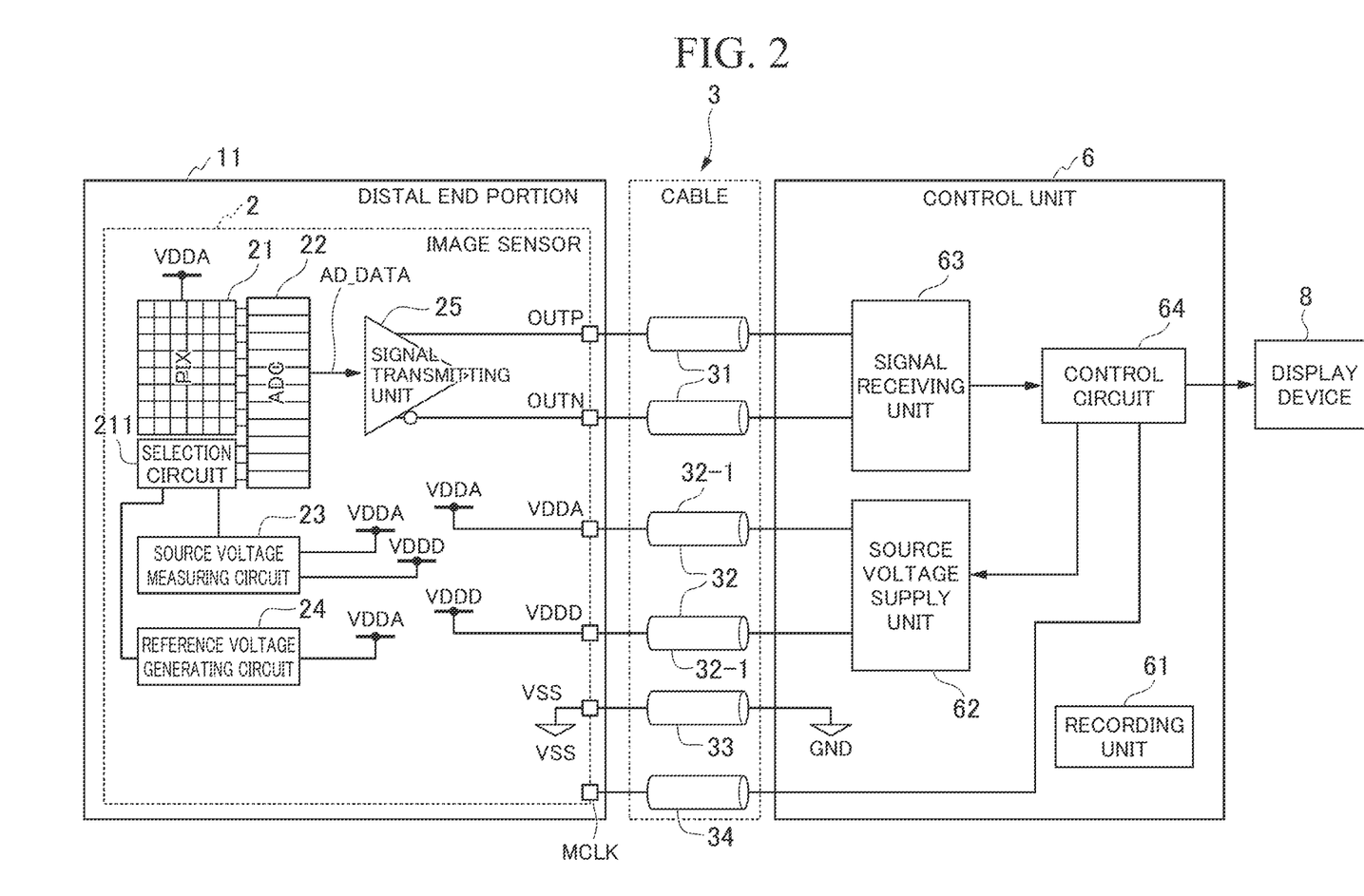
FIG. 2 is a block diagram of a camera unit and a control unit of the endoscope system.

FIG. 2 is a block diagram of the image sensor 2 and the control unit 6.

The image sensor 2 and the control unit 6 are connected by a transmission cable 3. The transmission cable 3 generically refers to a transmission path including a cable inserted into the insertion portion 10 of the endoscope 1 and the universal cord 5. The transmission cable 3 includes an image signal line 31 for transmitting an image signal, a source voltage supply line (a source voltage line) 32 (32-1 and 32-2) for transmitting electric power, a ground line 33, and a master clock line 34.

The image signal line 31 is a transmission line for outputting a differential signal from a signal transmitting unit 25 of the image sensor 2 to a signal receiving unit 63 of the control unit 6 via differential output terminals (OUTP/OUTN).

The source voltage supply line 32-1 is a transmission line for connecting VDDA of the image sensor 2 to a source voltage supply unit 62 of the control unit 6. The source voltage supply line 32-2 is a transmission line for connecting VDDD of the image sensor 2 to the source voltage supply unit 62 of the control unit 6.

The ground line 33 is a transmission line for connecting a source voltage VSS of the image sensor 2 to GND in the control unit 6. The master clock line 34 is a transmission line for inputting a master clock from a control circuit 64 of the control unit 6 to a master clock MCLK of the image sensor 2.

Control Unit (Control Device) 6

As illustrated in FIG. 2, the control unit (control device) 6 includes a recording unit 61, a source voltage supply unit (source voltage supply device) 62, a signal receiving unit (a signal receiving device) 63, and a control circuit 64.

The recording unit 61 is a nonvolatile recording medium that stores programs or necessary data. The recording unit 61 includes a portable medium such as a flexible disk, a magneto-optical disc, a ROM, a writable nonvolatile memory such as a flash memory, or a CD-ROM and a storage device such as a hard disk incorporated into a computer system.

A measured value of a source voltage of an analog-based IC in the image sensor 2 is defined as a second source voltage value (VDDA), and a measured value of a source voltage of a digital-based IC is defined as a third source voltage value (VDDD). The source voltage supply unit 62 of the control unit 6 adjusts a first source voltage (Vout) such that a second source voltage (VDDA') supplied to the image sensor 2 is in a recommended operating voltage range (an optical value) on the basis of a value (VDDA) indicating the second source voltage value and a value (VDDD) indicating the third source voltage value which are input from the image sensor 2 via the source voltage supply line 32 and supplies the adjusted first source voltage to the source voltage supply line 32.

The signal receiving unit 63 receives an image signal and a result of AD conversion in an AD conversion unit 22 from the image sensor 2 via the image signal line 31.

The control circuit 64 comprehensively controls the endoscope system 100 including the storage unit 61, the source voltage supply unit 62, and the signal receiving unit 63 as a whole. The control circuit 64 performs image processing on an image signal output from the image sensor 2. The control circuit 64 transmits an image to be displayed on the display device 8. The control circuit 64 inputs a master clock to the master clock MCLK of the image sensor 2 via the master clock line 34.

The control circuit 64 is a program-executable processing circuit (computer) including one or more processors (such as a CPU, a GPU, or a DSP) and a memory that can read a program. The control circuit 64 controls the endoscope system 100 by executing an endoscope control program. The control circuit 64 may include a dedicated computing circuit. The dedicated computing circuit is a processor separate from the processor of the control circuit 64, a logical circuit mounted in an ASIC or an FPGA, or a combination thereof.

Image Sensor 2

The image sensor 2 generates an image signal by converting a subject image formed via the optical system 16. The image sensor 2 outputs the generated image signal to the control unit 6 via the image signal line 31. The image sensor 2 is supplied with electric power from the control unit 6 via the source voltage supply line 32.

The image sensor 2 includes a pixel array 21, a selection circuit 211, an AD conversion device (AD conversion circuit) 22, a source voltage measuring circuit 23, a reference voltage generating circuit 24, and a signal transmitting unit 25, which are illustrated in FIG. 2, and is a semiconductor chip in which these constituents are provided on the same board.

The pixel array 21 includes a pixel unit 210 in which pixels P11 to Pij for accumulating photoelectrically converted electric charges and outputting a photoelectric conversion signal corresponding to an amount of incident light are arranged in a matrix shape. The pixel array 21 is driven with the second source voltage (VDDA') and generates a signal of an accumulation level (an accumulation signal) corresponding to an amount of received light and an image signal of a reset level (a reset signal). The pixel array 21 outputs the reset signal and the accumulation signal in response to a control signal from the outside.

The selection circuit 211 is connected to the source voltage measuring circuit 23, the reference voltage generating circuit 24, and the AD conversion unit 22 and outputs inputs from the source voltage measuring circuit 23 and the reference voltage generating circuit 24 to the AD conversion unit 22.

Figure 3:
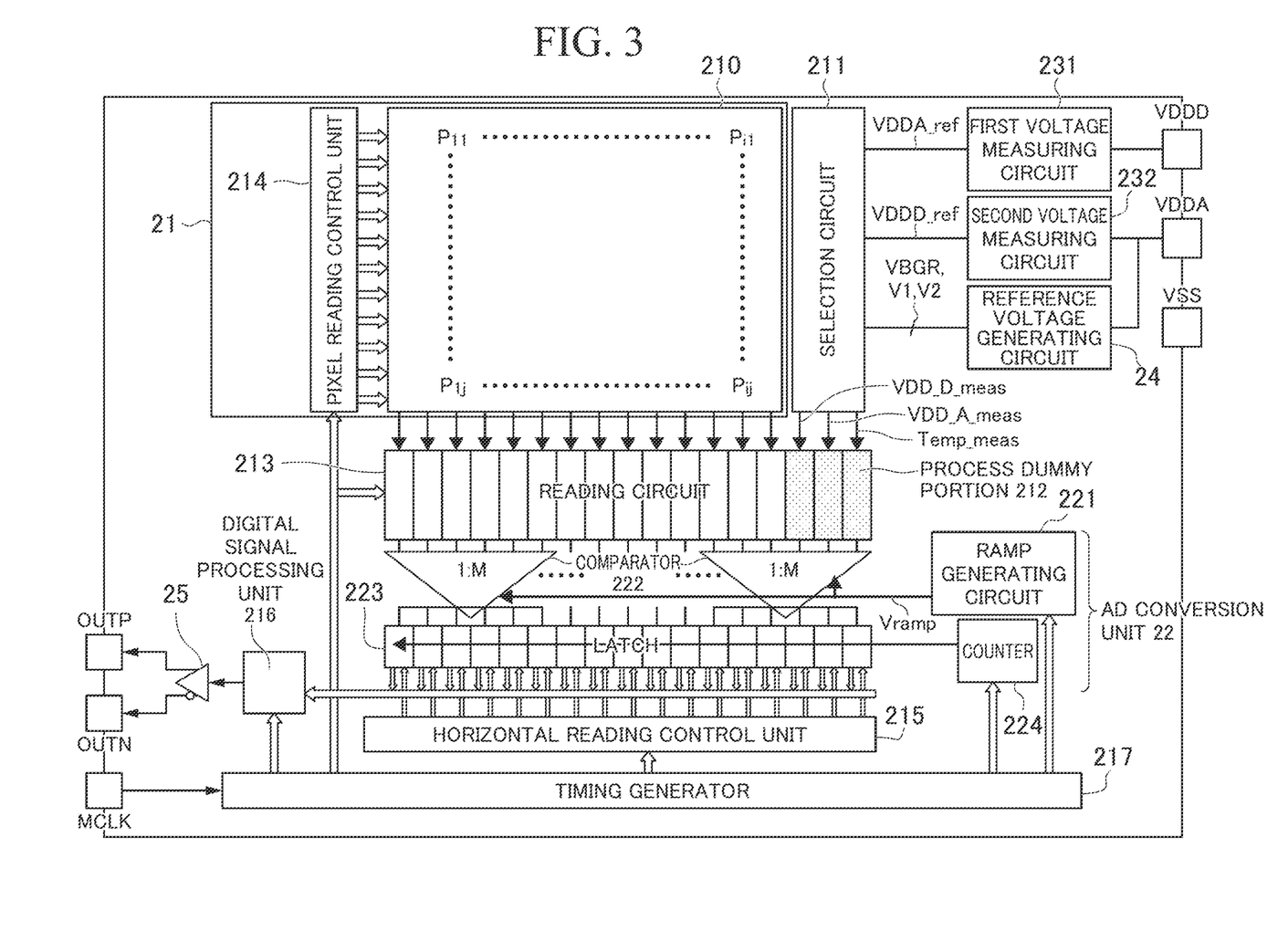
FIG. 3 is a block diagram schematically illustrating a configuration of a pixel array 21.

The source voltage measuring circuit 23 illustrated in FIG. 2 includes a first source voltage measuring circuit 231 and a second source voltage measuring circuit 232 illustrated in FIG. 3.

The second source voltage measuring circuit 232 is connected to a VDDA terminal and the selection circuit 211. The second source voltage VDDA is input to the second source voltage measuring circuit 232 via the source voltage supply line 32. The second source voltage measuring circuit 232 outputs a value (VDDA_ref) indicating a second source voltage value which is a measured value of a source voltage of an analog-based IC in the pixel array 21. The analog-based IC is mainly an upstream circuit (3.3 V-based) such as a reading circuit and a pixel unit.

The first source voltage measuring circuit 231 is connected to a VDDD terminal and the selection circuit 211. The first source voltage measuring circuit 231 measures and outputs a value (VDDD) indicating a third source voltage value which is a measured value of a source voltage of a digital-based IC in the pixel array 21. The digital-based IC is mainly downstream circuit (1.2 V-based) such as an AD conversion device.

Referring back to FIG. 2, the reference voltage generating circuit 24 is connected to the VDDA terminal and the selection circuit 211. The reference voltage generating circuit 24 generates a reference voltage (VBGR) with a bandgap reference or the like. The reference voltage generating circuit 24 generates the reference voltage (VBGR) by performing adjustment such that a difference between VDDA and VBGR is in a level range of a difference between an image signal and a reset level.

A plurality of AD conversion units 22 are provided to correspond to pixel columns of the pixel array 21 and are provided to correspond to the source voltage measuring circuit 23 (the first source voltage measuring circuit 231 and the second source voltage measuring circuit 232) and the reference voltage generating circuit 24. That is, the AD conversion units 22 are column ADCs provided to correspond to the number of pixel columns of the pixel array 21 and the source voltage measuring circuit 23 and the reference voltage generating circuit 24.

That is, a plurality of column ADCs are provided to correspond to the pixel columns of the pixel array 21 and are provided to correspond to the value (VDDA) indicating the second source voltage value, the value (VDDD) indicating the third source voltage value, and the reference voltage (VBGR).

Each AD conversion unit 22 samples the value (VDDA) indicating the second source voltage value at the time of sampling of the reset level of the pixel array 21. In addition, the AD conversion unit 22 samples the reference voltage (VBGR) at the time of sampling of the accumulation level of the pixel array 21.

The AD conversion unit 22 performs AD conversion (ramp wave comparison) for the corresponding pixel column of the pixel array 21 by performing correlative double sampling (CDS) of the accumulation level and the reset level of the pixel array. That is, the AD conversion unit 22 performs AD conversion of a difference between the accumulation level and the reset level of the pixel array 21. In this way, the AD conversion unit 22 performs AD conversion of the image signal.

In addition, the AD conversion unit 22 performs AD conversion by performing CDS of the value (VDDA) indicating the second source voltage and the reference voltage (VBGR) in the source voltage measuring circuit 23 (the second source voltage measuring circuit 232) and the reference voltage generating circuit 24. That is, the AD conversion unit 22 performs AD conversion of the difference between the value (VDDA) indicating the second source voltage and the reference voltage (VBGR).

In addition, the AD conversion unit 22 performs AD conversion by performing CDS of the value (VDDD) indicating the third source voltage and the reference voltage (VBGR) in the source voltage measuring circuit 23 (the first source voltage measuring circuit 231) and the reference voltage generating circuit 24. That is, the AD conversion unit 22 performs AD conversion of the difference between the value (VDDD) indicating the third source voltage and the reference voltage (VBGR).

The difference between the value (VDDA) indicating the second source voltage and the reference voltage and the difference between the value (VDDD) indicating the third source voltage and the reference voltage are set to be equal to or less than a difference between a maximum accumulable level and the reset level of the pixel array. Accordingly, when the AD conversion unit 22 performs AD conversion, it is possible to measure a source voltage signal along with an image signal (the difference between the accumulation level and the reset level).

The signal transmitting unit 25 outputs a result of AD conversion of the image signal, a result of AD conversion of the difference between the value (VDDA) indicating the second source voltage and the reference voltage (VBGR), and a result of AD conversion of the difference between the value (VDDD) indicating the third source voltage and the reference voltage (VBGR), in which the AD conversion has been performed by the AD conversion unit 22. That is, the signal transmitting unit 25 outputs a differential signal from the differential output terminal (OUTP/OUTN) to the signal receiving unit 63 of the control unit 6 via the image signal line 31.

By constituting the AD conversion unit 22 using the AD conversion devices corresponding to the pixel columns of the pixel array 21 and the AD conversion devices corresponding to the source voltage measuring circuit 23 and the reference voltage generating circuit 24, it is possible to perform AD conversion of an image signal and AD conversion of a source voltage in parallel. Accordingly, it is possible to perform AD conversion of a source voltage in an image signal output period without hindering AD conversion of an image signal or the like.

The reference voltage generating circuit 24 generates the reference voltage (VBGR) such that the difference between the value (VDDA) indicating the second source voltage and the reference voltage and the difference between the value (VDDD) indicating the third source voltage and the reference voltage are in a level range of the difference between the accumulation level and the reset level of the pixel array.

With this configuration, the AD conversion unit 22 can perform AD conversion of the source voltage of the digital-based IC (1.2 V-based) in addition to AD conversion of the source voltage of the analog-based IC (3.3 V-based) and thus it is possible to more accurately monitor the source voltage in the pixel array 21.

FIG. 3 is a block diagram illustrating a detailed configuration of the image sensor 2. The image sensor 2 includes the pixel array 21, the selection circuit 211, the first source voltage measuring circuit 231, the second source voltage measuring circuit 232, the reference voltage generating circuit 24, a process dummy portion 212, the AD conversion unit 22, a digital signal processing unit 216, a horizontal reading unit 215, a timing generator 217, and the signal transmitting unit 25.

The pixel array 21 includes a pixel unit 210 and a pixel reading control unit 214.

The AD conversion unit 22 includes a ramp wave generating circuit 221, a comparator 222, a latch 223, a counter 224, and a reading circuit 213.

These constituents are mounted on the same substrate of a semiconductor chip.

The first source voltage measuring circuit 231 measures and outputs a value (VDDD_meas) indicating a third source voltage which is a measured value of the source voltage of the digital-based IC in the pixel unit 210. The third source voltage value changes at a first rate of change with change in PVT (P: Process, V: Voltage, T: Temperature) of the cip.

The second source voltage measuring circuit 232 measures and outputs a value (VDDA) indicating the second source voltage which is a measured value of the source voltage of the analog-based IC in the pixel unit 210. The second source voltage value changes at a rate of change with change in PVT which is a second rate of change different from the first rate of change.

The reading circuit 213 is a CDS circuit that is provided for each column of the pixel unit 210, and (i) reading circuits are provided to the pixel columns, and each reading circuit includes a capacitor C<k> and a switch SW<k> (where k is an arbitrary natural number satisfying 1≤k≤i). The reading circuit 213 reads a photoelectric conversion signal output from the pixel unit 210 and the third source voltage value and the second source voltage value by performing signal processing (CDS) thereon.

The process dummy portion 212 is provided near the reading circuit 213. The process dummy portion 212 has the same configuration as the reading circuit 213. Three process dummy portions 212 can be provided to correspond to three outputs from the selection circuit 211. The selection circuit 211 is connected to the first source voltage measuring circuit 231, the second source voltage measuring circuit 232, and the reference voltage generating circuit 24.

The AD conversion unit 22 includes the ramp wave generating circuit 221, the comparator 222, the latch 223, the counter 224, and the reading circuit 213.

The ramp wave generating circuit 221 generates a ramp wave of a voltage Vramp and inputs the generated ramp wave to the comparator 222.

The comparator 222 compares a plurality of (M) inputs from the reading circuit 213 and outputs one output to the latch 223. In the example illustrated in the drawing, the comparator 222 is provided in 1:M manner (outputs of M reading circuits are processed by one comparator), but the comparators may be provided in a 1:1 (one output of one reading circuit is processed by one comparator). The operations of the comparator 222, the latch 223, and the counter 224 will be described later.

The pixel reading control unit 214 and the horizontal reading unit 215 output a control signal for sampling the third source voltage value, the reset signal, the second source voltage value, and the accumulation signal at the same timing in response to a signal from the timing generator 217.

The digital signal processing unit 216 converts image signals (parallel signals) latched in the latch 223 to serial signals and outputs the serial signals as differential signals to the outside of the chip via the differential output terminals OUTP and OUTN. MCLK is a master clock and operates the timing generator 217 on the basis of a clock from the processor.

Figure 4:
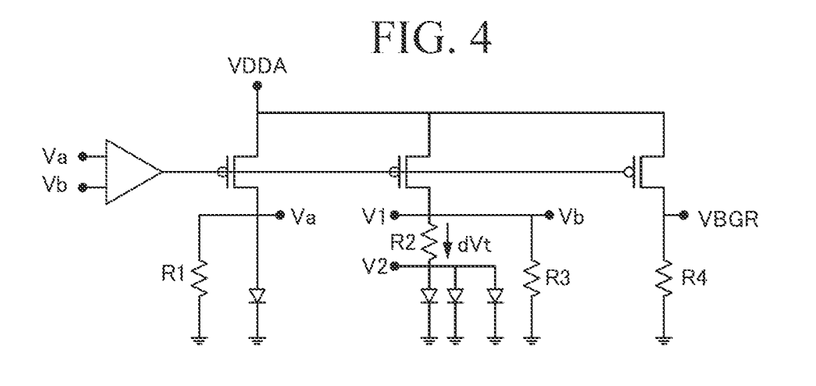
FIG. 4 is a circuit diagram of a reference voltage generating circuit 24.

FIG. 4 is a circuit diagram of the reference voltage generating circuit 24. In the drawing, Va in the circuit is connected to Va, and Vb in the circuit is connected to Vb. The reference voltage generating circuit 24 receives an input of VDDA and generates the reference voltage (VBGR) by performing adjustment such that the difference between VDDA and VBGR is in the level range of the difference between an image signal and the reset level. VBGR is a voltage which is stable in PVT.

Figure 5:
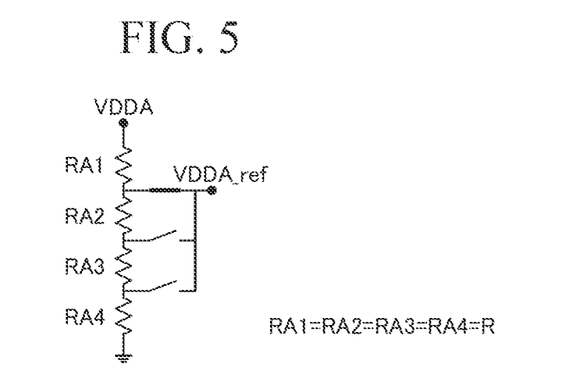
FIG. 5 is a circuit diagram of a first source voltage measuring circuit 231.
Figure 6:
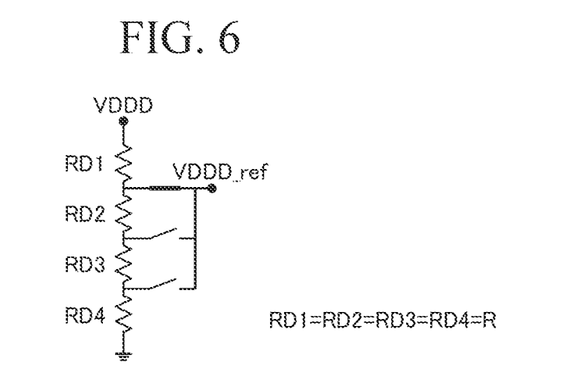
FIG. 6 is a circuit diagram of a second source voltage measuring circuit 232.

FIG. 5 is a circuit diagram of the first source voltage measuring circuit 231, and FIG. 6 is a circuit diagram of the second source voltage measuring circuit 232. The downward direction in the drawing is the distal end side of the endoscope.

In the circuit illustrated in FIG. 5, four resistors RA1 to RA4 are disposed between GND and VDDA. One of a node between RA1 and RA2, a node between RA2 and RA3, and a node between RA3 and RA4 is selectively connected to an output via switches. It is assumed that resistance values of all the resistors constituting the circuit illustrated in FIG. 5 are R. That is, it is assumed that RA1=RA2=RA3=RA4=R is established in FIG. 5. In FIG. 5, the node between RA1 and RA2 is selected as an output, and the output is VDDA_ref=VDDA*(3R/4R). When the node between RA2 and RA3 is selected as an output, the output is VDDA_ref=VDDA*(2R/4R). When the node between RA3 and RA4 is selected as an output, the output is VDDA_ref=VDDA*(1R/4R).

Similarly, in the circuit illustrated in FIG. 6, four resistors RD1 to RD4 are disposed between GND and VDDD. One of a node between RD1 and RD2, a node between RD2 and RD3, and a node between RD3 and RD4 is selectively connected to an output via switches. It is assumed that resistance values of all the resistors constituting the circuit illustrated in FIG. 6 are R. That is, it is assumed that RD1=RD2=RD3=RD4=R is established in FIG. 6. In FIG. 6, the node between RD1 and RD2 is selected as an output, and the output is VDDD_ref=VDDD*(3R/4R). When the node between RD2 and RD3 is selected as an output, the output is VDDD_ref=VDDD*(2R/4R). When the node between RD3 and RD4 is selected as an output, the output is VDDD_ref=VDDD*(1R/4R).

In this way, the first source voltage measuring circuit 231 and the second source voltage measuring circuit 232 are voltage division circuits.

Figure 7:
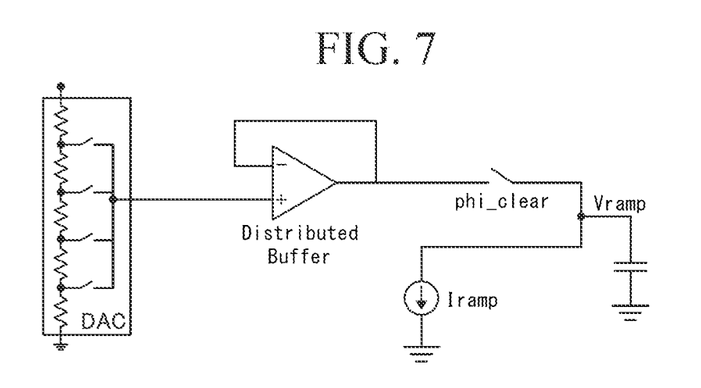
FIG. 7 is a circuit diagram of a ramp wave generating circuit 221.

FIG. 7 is a circuit diagram of the ramp wave generating circuit 221. The ramp wave generating circuit 221 includes a capacitor and a power source. When a switch phi_clear is closed, a voltage instructed by the DAC is input to a buffer circuit (Distributed Buffer), and a voltage of a ramp wave Vramp increases. When the switch phi_clear is opened, a voltage charged in the capacitor flows gradually to the GND via Iramp, and the voltage of the ramp wave Vramp decreases gradually.

Figure 8:
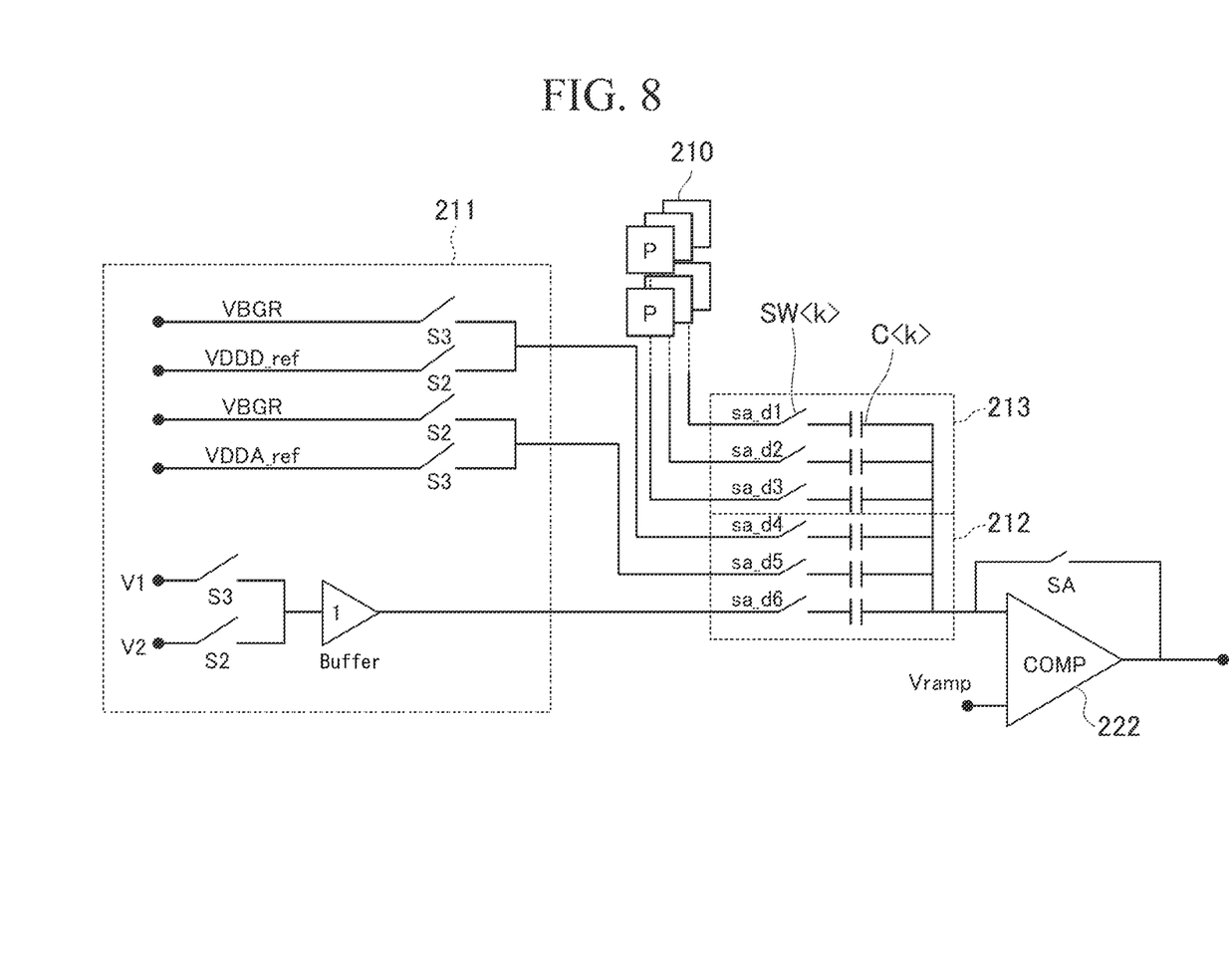
FIG. 8 is a diagram illustrating an AD conversion unit 22 including a comparator 222 and a reading circuit 213.

FIG. 8 is a diagram illustrating an AD conversion unit 22 including a comparator 222 and a reading circuit 213. The comparator 222 in FIG. 8 has a 1:6 configuration for processing outputs of three columns of the pixel unit 210 and three outputs of the selection circuit 211 using one comparator. A plurality of comparators for processing six columns of the pixel unit 210 are present in addition to the comparator illustrated in the drawing.

The reading circuit 213 and the process dummy portion 212 include switches SW<k> and capacitors C<k>.

In the selection circuit 211, one of VBGR and VDDD_ref is selected as a signal sa_d4(VDDD_out). One of VBGR and VDDA_ref is selected as a signal sa_d5(VDDA_out). An output of a buffer circuit based on V1 and V2 is a signal sa_d6(Vtemp_out).

Outputs of three columns (normal reading signals from pixel columns) sa_d1 to sa_d3 (pixout_1 to pixout_3) of the pixel unit 210 are input to the reading circuit 213. Three outputs sa_d4 to sa_d6 of the selection circuit 211 are input to the process dummy portion 212.

Photoelectric conversion signals (sa_d1 to sa_d3) from the pixel unit 210 or outputs of the selection circuit 211 are input to a first terminal of the comparator 222. The outputs from the selection circuit 211 are VBGR or VDDD_ref (sa_d4), VBGR or VDDA_ref(sa_d5), or the output (sa_d6) of the buffer circuit based on the voltages V1 and V2. V1 in FIG. 8 is connected to V1 in FIG. 4, and V2 in FIG. 8 is connected to V2 in FIG. 4.

With this configuration, the comparator 222 performs a subtraction process such as VDDD_ref-VBGR, VDDA_ref-VBGR, or V1-V2. Here, sa_d1 to sa_d3 correspond to the reading circuit 213, and sa_d4 to sa_d6 correspond to the process dummy portion 212.

A ramp wave Vramp is input to a second terminal of the comparator 222. The comparator 222 compares two inputs of a voltage signal input to the first terminal and the voltage signal input to the second terminal, and an output signal thereof transitions (from H to L or from L to H) at a timing at which the voltage value of the ramp wave Vramp becomes less than the photoelectric conversion signals (sa_d1 to sa_d3) or the output signals of the selection circuit 211.

The counter 224 starts a counting operation at the same time as start of sweeping of the ramp wave Vramp.

A latch LAT<k> provided for each column holds a count value at the timing at which the output signal of the comparator 222 transitions. A count value corresponding to a voltage signal read to the capacitor C<k> is held in each latch LAT<k>.

When six counting operations end, the horizontal reading unit 215 sequentially sends the count values held in the latches <k> to the digital signal processing unit 216. In this way, AD conversion and reading of a result of AD conversion are performed.

The result of AD conversion of VDDA_ref-VBGR and the result of AD conversion of VDDD_ref-VBGR are received as a source voltage of a distal end portion by the system. VDDA_ref and VDDD_ref can be considered to be a voltage output proportional to a source voltage change (of which the proportional coefficient is known), and VBGR can be considered to be a constant reference voltage which is not affected by change in PVT. That is, a difference between these two voltages indicates a source voltage change of the distal end portion.

The voltages V1 and V2 satisfy the following expression.

$$V1-V2=dVt=VT\cdot ln(N)=(kT/q)\cdot ln(N)=A\cdot T \text{ (where the proportional constant } A \text{ is known)}$$

Accordingly, the difference voltage V1-V2 indicates the absolute temperature of the distal end portion. Here, k is the Boltzmann constant, T is the absolute temperature, q is the elementary electric charge, and N is a proportion of the number of diodes connected to the terminal V2 when the number of diodes connected to the terminal V1 is set to 1.

With this configuration, the temperature and the source voltage can be monitored by only adding a voltage detecting circuit (a resistor ladder) and an analog switch in addition to a bandgap circuit or a column ADC (a column capacitor array) which is an element block originally required for an image sensor.

Figure 9:
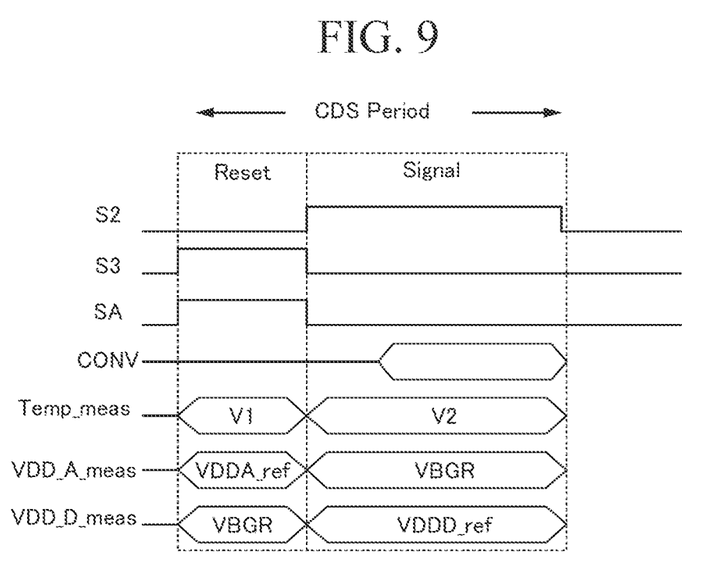
FIG. 9 is a timing chart of signals illustrating a CDS operation in the reading circuit 213.

FIG. 9 is a timing chart illustrating signals in a CDS period in the reading circuit 213. The CDS period (CDS_period) includes a reset period (Reset) and a signal period (Signal).

S2, S3, and SA indicate the states of the switches S2, S3, and SA in FIG. 8. In the reset period SA and S3 are turned on and S2 is turned off. In the signal period, SA and S3 are turned off and S2 is turned on.

Conv is a control signal for performing AD conversion and is input in the signal period.

Temp_meas (Vtemp_out) is the signal sa_d6 in FIG. 8. Temp_meas is V1 in the reset period and is V2 in the signal period. V1>V2 is established.

VDD_A_meas (VDDA_out) is the signal sa_d5 in FIG. 8. VDD_A_meas is VDDA_ref in the reset period and is VBGR in the signal period. VDDA_ref>VBGR is established.

VDD_D_meas (VDDD_out) is the signal sa_d4 in FIG. 8. VDD_D_meas is VBGR in the reset period and is VDD-D_ref in the signal period. VBGR>VDDD_ref is established.

Figure 10:
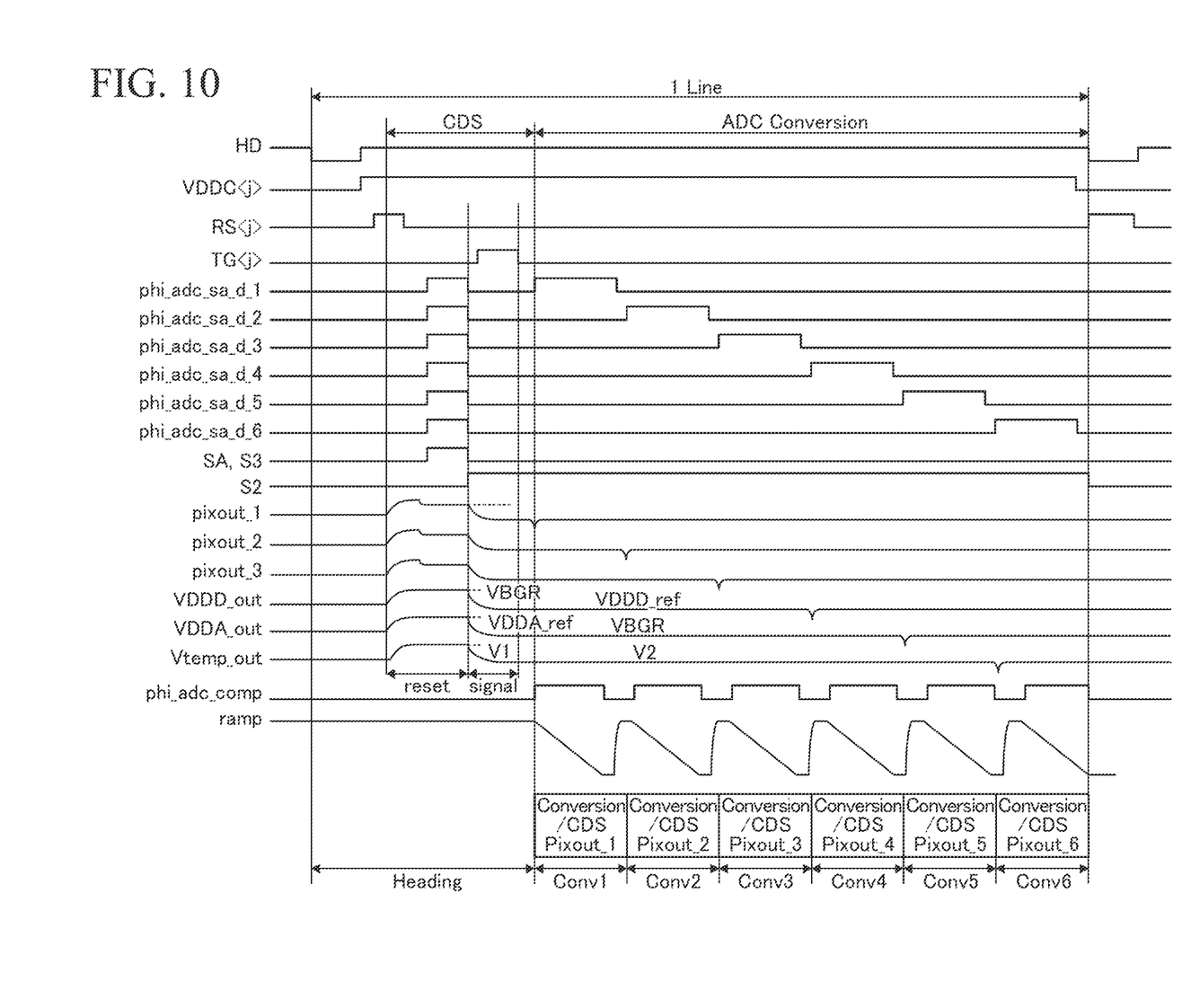
FIG. 10 is a timing chart of signals.

FIG. 10 is a timing chart of signals in the AD conversion unit 22 illustrated in FIG. 8.

A heading period is the whole period of a one-line processing period (1 Line) of the pixel unit and includes the CDS period in FIG. 9. The CDS period includes a reset period (reset) and a signal period (signal). An ADC conversion period is subsequent to the CDS period.

The ADC conversion period includes six periods Conversion/CDS Pixout_1 to Conversion/CDS Pixout_6 (Conv1 to Conv6) in which AD conversion of pixels is sequentially performed.

HD is a signal for defining a period of 1 line which is generated by the timing generator 217.

Figure 11:
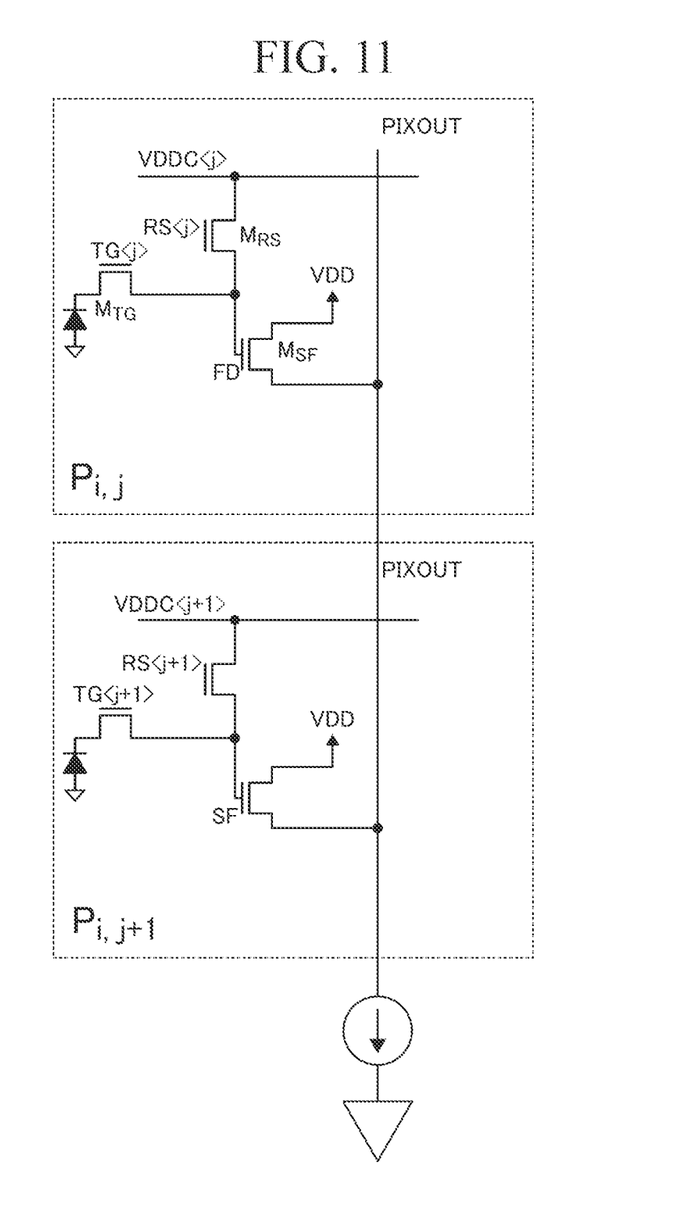
FIG. 11 is a circuit diagram of a pixel unit.

In order to explain signals VDDC<j>, RS<j>, and TG<j>, a circuit diagram of the pixel unit is illustrated in FIG. 11. $P_{i,j}$ and $P_{i,j+1}$ are neighboring pixels.

The signal VDDC<j> is a signal for selecting a pixel in the j-th row. In the timing chart illustrated in FIG. 10, the timing at which VDDC<J> transitions to H is illustrated, and reset, transmission, and reading in the pixels of the j-th row are performed in only this H period. VDDC<x> other than the j-th row is fixed to L, and reading is not performed.

The signal RS<j> is a signal for resetting a reading transistor MSF of the pixels in the j-th row. When RS<j> becomes H, the gate terminal (a floating diffusion FD) of the reading transistor MSF is reset to a source voltage VDDA, and dark electric charges of the floating diffusion are discharged. A pixel output (PIXOUT) immediately after RS<j> is returned to L from H is held as a reset voltage in a column circuit.

During operation in the j-th row, RS<x> in the other rows is non-selected (fixed to L). After reading in the i-th row has been completed (subsequently to Conv6), RS<j> transitions to H again in a state of VDDC<j>=L in order to reliably non-select MSF in the i-th row.

TG<j> is a signal for operating a transmission transistor MTG of the pixels in the j-th row. When TG<j> becomes H, electric charges accumulated in a photodiode are transmitted to FD. In FD, charge-voltage conversion is performed, the voltage of FD decreases in proportion to the transmitted electric charges, and thus the output voltage of PIXOUT also decreases. This voltage is held as a voltage of an image level in the column circuit. During operation in the j-th row, TG<x> in the other rows is non-selected (fixed to L).

In the column circuit, electric charges proportional to the difference voltage between the reset voltage and the voltage of the image level are held.

phi_adc_sa_d_1 to phi_adc_sa_d_6 are the states of the switches SW<k> (sa_d1 to sa_d6) in FIG. 8. All the switches are temporarily turned on in the reset period and are turned off in the signal period. In a period corresponding to the ADC conversion period, the switches are turned on. For example, phi_adc_sa_d_1 is ON in Conv1 in which AD conversion of one pixel column is performed and is OFF in Conv2 to Conv6 subsequent thereto.

SA, S3, and S2 indicate switches SA, S3, and S2 in FIG. 8. In the reset period, SA and S3 are ON. In the signal period, SA and S3 are OFF and S2 is ON. The OFF state of SA and S3 and the ON state of S2 are maintained in the AD conversion period.

pixout_1 to pixout_3 are waveforms of the reading signals sa_d1 to sa_d3 from three pixel columns of the pixel unit 210 in FIG. 8. The signals sa_d1 to sa_d3 increase when all the pixels are reset in the reset period, and the signals sa_d1 to sa_d3 decrease slightly to the reset level at the timing at which SA is turned on when resetting has ended. When SA is turned off, the signal period starts, and the signals sa_d1 to sa_d3 corresponding to the voltages of the pixels decrease.

VDDD_out is a waveform of the signal sa_d4 in FIG. 8. This signal increases to VBGR in the reset period and decreases to VDDD_ref in the signal period.

VDDA_out is a waveform of the signal sa_d5 in FIG. 8. This signal increases to VDDA_ref in the reset period and decreases to VBGR in the signal period.

Vtemp_out is a waveform of the signal sa_d6 in FIG. 8. This signal increases to V1 in the reset period and decreases to V2 in the signal period.

phi_adc_comp is the operation of the comparator 222 (COMP). When AD conversion is being performed, phi_adc_comp is at H. When the AD conversion ends, phi_adc_comp becomes L, and the voltage Vramp of the ramp wave increases.

ramp indicates the voltage Vramp of the ramp wave input from the ramp wave generating circuit 221. A top portion of the ramp wave is a state in which phi_clear is closed in FIG. 7. A descending portion of the ramp wave is a state in which phi_clear is opened in FIG. 7 and the voltage Vramp of the ramp wave decreases gradually. At the timing at which the ramp wave returns to the top, data held in the latch is pushed out to the digital signal processing unit.

While an embodiment of the present invention has been described above in details with reference to the drawings, a specific configuration is not limited to this embodiment and includes a change in design without departing from the gist of the present invention. Elements described in the aforementioned embodiment and following modified examples can be appropriately combined into a configuration.

Some or all of the aforementioned functions may be performed by recording a program for the embodiment on a computer-readable recording medium and causing a computer system to read and execute the program recorded on the recording medium. The "computer system" includes an operating system (OS) or hardware such as peripherals. Examples of the "computer-readable recording medium" include a portable medium such as a flexible disk, a magneto-optical disc, a ROM, or a CD-ROM and a storage device such as a hard disk incorporated into a computer system. The "computer-readable recording medium" may include a medium that dynamically holds a program for a short time such as a communication line when a program is transmitted via a network such as the Internet or a communication line such as a telephone line and a medium that holds a program for a predetermined time such as a non-volatile memory in a computer system serving as a server or a client in that case. The program may be a program for realizing some of the aforementioned functions or may be able to realize the aforementioned functions in combination with another program stored in advance in the computer system.

What is claimed is:

1. An imaging system in which a camera unit and a control unit are connected via a source voltage line and an image signal line,
   wherein the camera unit includes:
   a pixel array configured to generate an accumulation signal and a reset signal;
   a source voltage measuring circuit configured to output a voltage value (VDDA) indicating a second source voltage in the pixel array;
   a reference voltage generating circuit configured to generate a reference voltage (VBGR);
   a plurality of AD conversion devices provided to correspond to pixel columns of the pixel array and provided to correspond to the source voltage measuring circuit and the reference voltage generating circuit and configured to perform first AD conversion of a difference between the accumulation signal and the reset signal of the pixel array and second AD conversion of a difference between a value (VDDA) and the reference voltage (VBGR) together; and
   a signal transmitting unit configured to output results of the first AD conversion and the second AD conversion, and
   wherein the control unit includes:
   a source voltage supply device configured to supply a first source voltage (Vout) to the source voltage line; and
   a signal receiving device configured to receive the image signal and the result of the second AD conversion.

2. The imaging system according to claim 1, wherein the AD conversion devices are column ADCs provided to correspond to the number of pixel columns of the pixel array and to correspond to the source voltage measuring circuit and the reference voltage generating circuit.

3. The imaging system according to claim 1, wherein the reference voltage generating circuit generates the reference voltage (VBGR) such that a difference between a value (VDDA) indicating the second source voltage value and the reference voltage (VBGR) is in a level range of a difference between a maximum accumulable level and the reset level of the pixel array.

4. The imaging system according to claim 1, wherein the source voltage measuring circuit measures and outputs a value (VDDA_ref) indicating the second source voltage for driving an analog-based IC in the pixel array and measures and outputs a value (VDDD_ref) indicating a third source voltage value for driving a digital-based IC in the pixel array, > wherein the AD conversion devices are provided to correspond to the pixel columns of the pixel array and provided to correspond to the value (VDDA_ref) indicating the second source voltage and the value (VDDD_ref) indicating the third source voltage value,
>
> wherein the AD conversion devices perform the first AD conversion of the difference between the accumulation level and the reset level of the pixel array, second AD conversion of a difference (VDDA_meas) between the value (VDDA_ref) indicating the second source voltage and the reference voltage (VBGR), and third AD conversion of a difference (VDDD_meas) between the value (VDDD_ref) indicating the third source voltage value and the reference voltage (VBGR) together, and
>
> wherein the signal transmitting unit outputs the result of the first AD conversion, the result of the second AD conversion, and a result of the third AD conversion in the AD conversion devices.

5. The imaging system according to claim 4, wherein the reference voltage generating circuit generates the reference voltage (VBGR) such that the difference (VDDA-meas) between the value (VDDA_ref) indicating the second source voltage and the reference voltage or the difference (VDDD_meas) between the value (VDDD_ref) indicating the third source voltage value and the reference voltage is in a level range equal to or less than a difference between a maximum accumulable level and the reset level of the pixel array, and > wherein the AD conversion devices performs AD conversion of a difference signal in the level range of the difference between the maximum accumulable level and the reset level of the pixel array.

6. The imaging system according to claim 5, wherein the AD conversion devices are able to change a range in which AD conversion of the difference signal is performed based on the accumulation level of the pixel array varying according to an amount of light, and > wherein the reference voltage generating circuit includes an adjustment mechanism for adjusting the difference (VDDA_meas) between the value (VDDA_ref) indicating the second source voltage and the reference voltage or the difference (VDDD_meas) between the value (VDDD_ref) indicating the third source voltage value and the reference voltage to be in a voltage level range in which the AD conversion devices perform AD conversion.

7. The imaging system according to claim 1, wherein the camera unit includes a temperature sensor that outputs a value indicating a temperature of the camera unit, > wherein the AD conversion devices perform third AD conversion of a difference between the value indicating the temperature of the camera unit and the reference voltage (VBGR) instead of the difference between the value (VDDA) indicating the second source voltage and the reference voltage (VBGR),
>
> wherein the signal transmitting unit outputs the result of the first AD conversion and a result of the third AD conversion performed by the AD conversion devices, and
>
> wherein the signal receiving device receives the image signal and the result of the third AD conversion.

8. An endoscope system in which the camera unit in the imaging system according to claim 1 is provided at a distal end of a scope of an endoscope.

9. A camera unit in an imaging system in which the camera unit and a control unit are connected via a source voltage line and an image signal line, the camera unit comprising:

a pixel array configured to generate an accumulation signal and a reset signal;

a source voltage measuring circuit configured to output a voltage value (VDDA) indicating a second source voltage in the pixel array;

a reference voltage generating circuit configured to generate a reference voltage (VBGR);

a plurality of AD conversion devices provided to correspond to pixel columns of the pixel array and provided to correspond to the source voltage measuring circuit and the reference voltage generating circuit and configured to perform first AD conversion of a difference between the accumulation signal and the reset signal of the pixel array and second AD conversion of a difference between a value (VDDA) and the reference voltage (VBGR) together; and a signal transmitting unit configured to output results of the first AD conversion and the second AD conversion performed by the AD conversion devices.

10. A scope of an endoscope in which the camera unit according to claim 9 is provided at a distal end of the scope.

* * * * *